Jan. 16, 1962 C. E. SHEETZ 3,017,013
ARTICLE FEED MECHANISM
Filed Aug. 4, 1959 3 Sheets-Sheet 1
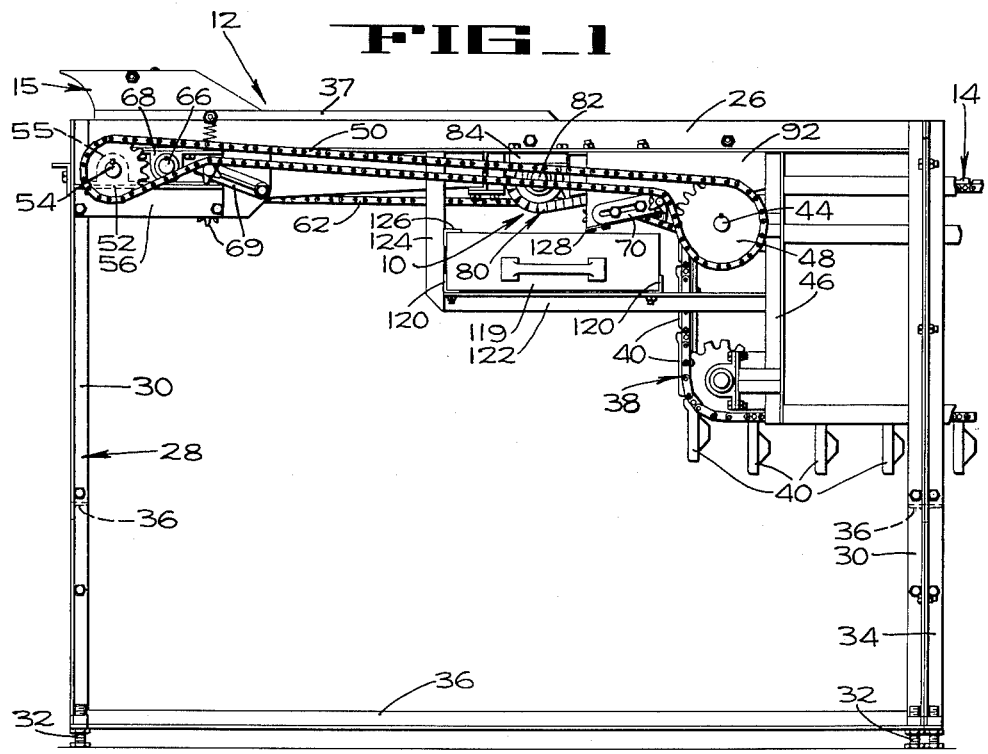
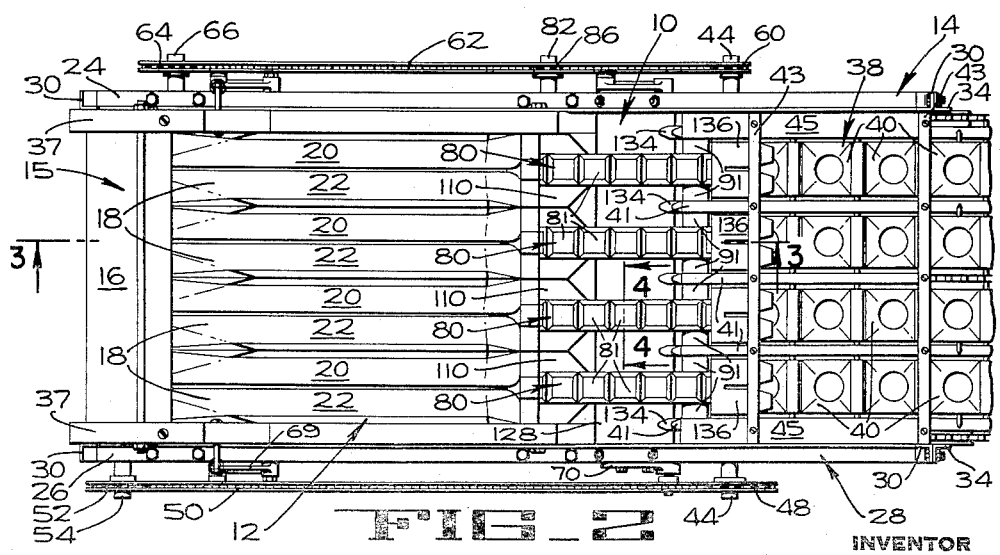
INVENTOR
CHARLES E. SHEETZ
BY Hans G. Hoffmeister
ATTORNEY

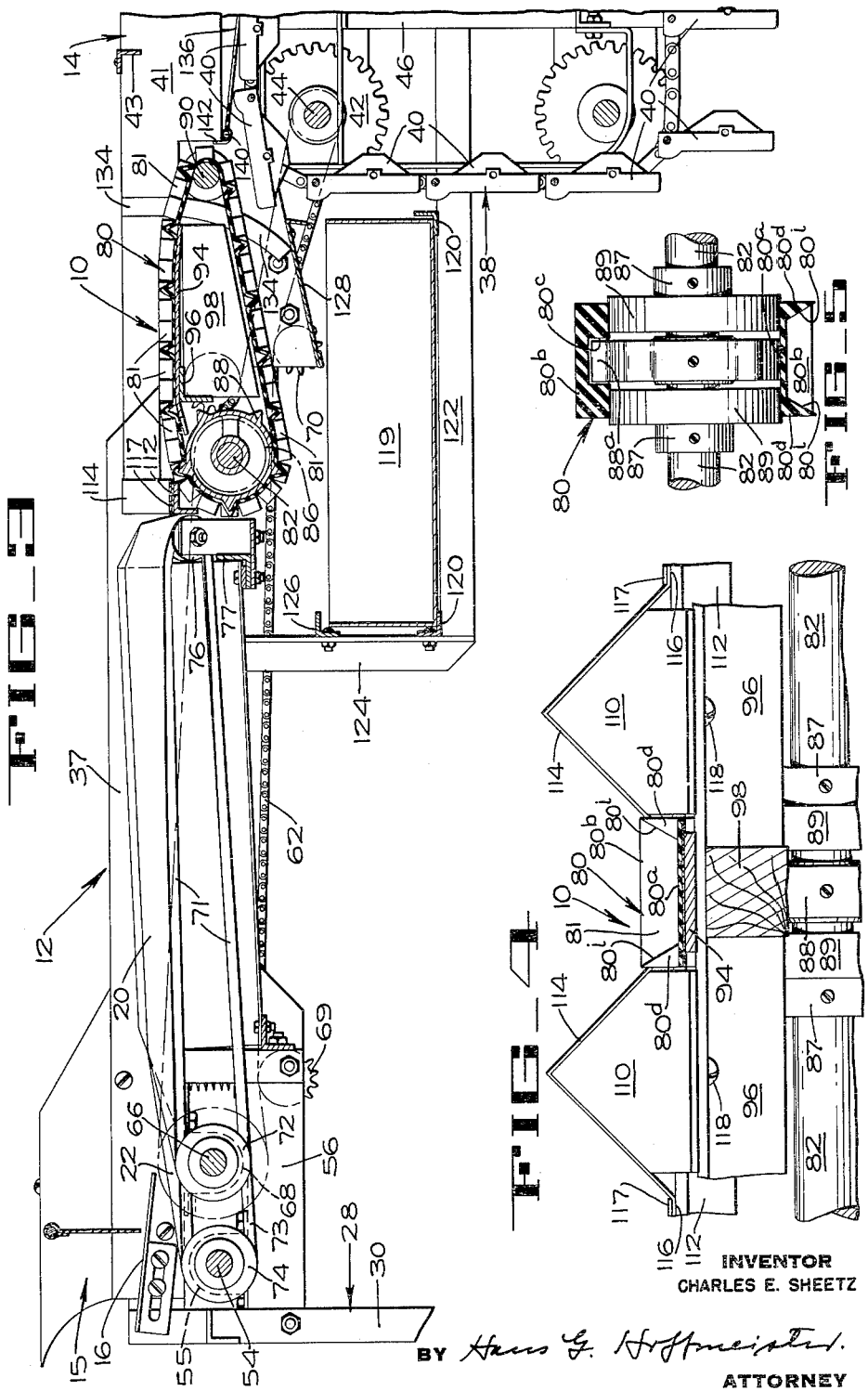

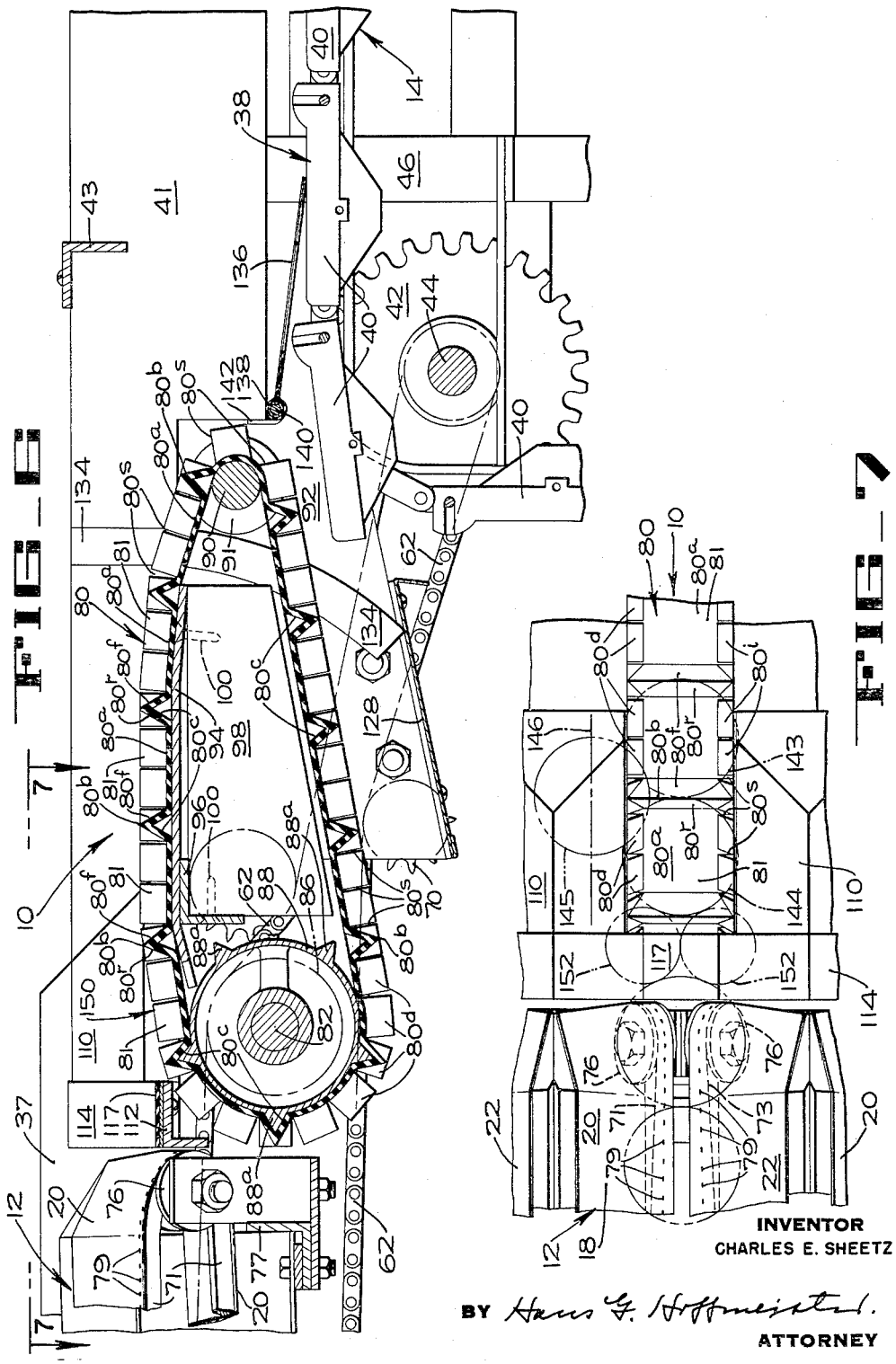

United States Patent Office 3,017,013
Patented Jan. 16, 1962

3,017,013
ARTICLE FEED MECHANISM
Charles E. Sheetz, Woodstock, Va., assignor to FMC Corporation, a corporation of Delaware
Filed Aug. 4, 1959, Ser. No. 831,658
7 Claims. (Cl. 198—102)

The present invention pertains to article sorting or grading machines and more particularly relates to an improved feed mechanism for such a machine.

Many of the machines employed in the fruit packing industry for the sorting or grading of fruit according to weight or size require that the fruit be conveyed thereto one at a time and in single file. One example of a machine of the type employed to grade fruit according to weight may be found in my copending application for a Grading Machine, Serial No. 783,269.

The feed mechanism of the present invention includes several single-file conveyors, one being interposed between a fruit line of the above identified grading machine and a corresponding line of an article aligning machine such as that disclosed in my U.S. Patent No. 2,813,617. The present invention further provides, in each of its single-file conveyors, an unusually simplified means whereby the fruit is spaced at predetermined intervals along its conveyor and only one file of fruit is permitted to remain on the conveyor during transfer of the fruit from the article aligning machine to the weight grading machine.

An object of the present invention is to provide an improved mechanism for conveying articles in equally spaced relationship and in single file procession.

Another object of the invention is to provide a conveyor adapted to convey articles of random size in equally spaced relationship and in single file procession.

Another object is to provide a fruit conveyor which handles the fruit so gently as to minimize abrading or bruising thereof.

Another object of the invention is to provide a fruit conveyor which will positively reject all fruit other than those which are arranged in a single file and in proper spaced relationship.

These and other objects and advantages of the present invention will become apparent from the following description and the accompanying drawings, in which:

FIGURE 1 is a side elevation of the feed mechanism of the present invention shown associated with an aligning machine and a part of a weight grading machine.

FIGURE 2 is a plan of the mechanism of FIGURE 1.

FIGURE 3 is an enlarged longitudinal section of the apparatus illustrated in FIGURE 2, taken on lines 3—3 thereof.

FIGURE 4 is a further enlarged fragmentary transverse section of one of the conveying belts taken on lines 4—4 of FIGURE 2.

FIGURE 5 is a sectional view of one of the fruit conveying belts and its associated drive sprocket.

FIGURE 6 is an enlarged longitudinal section of the apparatus of the present invention.

FIGURE 7 is a fragmentary plan view illustrating the operation of the mechanism of the present invention and is taken on lines 7—7 of FIGURE 6.

The feed mechanism 10 (FIGS. 1–3 and 6) of the present invention is interposed between an aligning machine 12 and a weight grading machine 14. The aligning machine 12 is constructed substantially as is disclosed in the above mentioned U.S. patent and is adapted to align a mass of articles into a plurality of single file lines. Articles of random size, such as apples, are deposited at the feed end 15 of the aligning machine 12 by a conveyor (not shown) and these apples descend by gravity over a downwardly inclined plate 16 (FIGS. 2 and 3) into contact with the aligning belts of the aligning machine 12.

The aligning machine 12 is comprised of four identical aligning units 18, positioned side by side, each of which is adapted to align the apples in a single-file line and frictionally convey the apples away from the inclined plate 16. Each aligning unit 18 is formed, in part, of a V-shaped trough defined by two aligning belts 20 and 22 which frictionally engage the apples. The belts 20 and 22 are driven at different speeds in order to rotate and separate certain apples advanced upon the upper flights of the belts causing substantially all the apples to gravitate toward and become aligned in single file along the apex of the trough.

The support means for the feed mechanism 10 and the aligning machine 12 includes two longitudinally extending horizontally disposed angle bars 24 and 26 (FIG. 2) of a rigid frame 28. Each bar 24 and 26 is connected at each end to one of four legs 30. So that the frame 28 may be positioned at a desired height, the bottom end of each leg 30 is provided with an adjustment bolt 32. Each of the two legs 30 at the rear end of the frame 28 is bolted to an adjacent support leg 34 of the grading machine 14. Angle bar braces 36 (FIG. 1) extend laterally of the aligning units 18 and interconnect the legs 30 to provide rigidity to the frame 28. A sideboard 37, coextensive with the aligning machine 12, is secured to the inside face of each angle 24 and 26 to prevent apples from falling over the sides of the aligning machine.

The grading machine 14 is in part comprised of an endless conveyor 38 (FIG. 2) formed by a plurality of lines of fruit receiving cups 40. Each line of cups 40 is disposed in longitudinal alignment with one of the aligning units 18. Adjacent lines of the cups 40 are separated by vertically disposed longitudinal walls 41 which are secured to two transversely extending support angle bars 43 affixed at their opposite ends to the frame angles 24 and 26. The angle bars 43 additionally support two vertically disposed side walls 45, one wall being located adjacent the inner edge of each frame angle 24 and 26.

Power for driving the conveyor 38 of the weight grading machine 14 is provided by an electric motor (not shown) at the discharge end of the grading machine. At the illustrated feed end of the grading machine 14, the conveyor 38 is trained around a pair of upper idler sprockets 42, only one being shown in FIGURE 3, which are so positioned upon the frame 28 that the cups 40 of the upper flight of the conveyor 38 advance in a substantially horizontal plane that is disposed slightly below the discharge end of the feed mechanism 10.

As is fully disclosed in my copending application, the feed cups 40 progress from the feed end of the grading machine 14 and pass over a series of scales. Each cup 40 is actuated by one of the scales according to the weight of the apple carried by the cup and the apple is dumped from the cup at a discharge station adjacent that particular scale.

The idler sprockets 42 of the grading machine 14 are rigidly secured to a transversely extending shaft 44 which is journalled at each end in suitable bearings (not shown) secured to vertically depending angle bars 46 (FIGS. 1 and 3) that are welded to the frame angles 24 and 26. During operation of the grading machine 14, the movement of the conveyor 38 rotates the idler sprockets 42 and the shaft 44 to which they are secured. The shaft 44 transmits driving movement to the feed mechanism 10 of the present invention, and to the aligning machine 12 by means which will next be described.

At the right side of the machine as shown in FIGURE 1, a drive sprocket 48 is secured to the shaft 44. An endless chain 50 is trained around the drive sprocket 48 and around a driven sprocket 52 of the aligning machine 12. The sprocket 52 is secured to a transversely extending aligner belt drive shaft 54 (FIGS. 1 and 3) journaled in two bearings 55, each of which is bolted to a bracket 56 depending from one of the frame angles 24 and 26 and secured to its adjacent leg 30. As will later be explained, the drive shaft 54 provides drive means for all of the aligning belts 22 which define one side of the aligning units 18.

All of the aligning belts 20 of the aligning units 18 are driven at a faster linear speed than the speed of the belts 22 by means which include a drive sprocket 60 (FIG. 2) secured to the shaft 44 at the left side of the machine. An endless chain 62 is trained around the drive sprocket 60 and around a driven sprocket 64. The sprocket 64 is rigidly secured to a transversely extending aligner belt drive shaft 66 positioned adjacent the drive shaft 54. Bearings 68 (FIGS. 1 and 3) journal each end of the drive shaft 66, and each bearing 68 is secured to the underside of one of the frame angles 24 and 26. The chains 50 and 62 are each tensioned to provide a positive driving engagement with their associated sprockets by a spring urged idler sprocket unit 69 (FIGS. 1–3). Adjustable idler sprocket units 70, adjacent the shaft 44, are also engaged with the chains 50 and 62.

Each aligning belt 20 of the aligning units 18 is driven from the drive shaft 66 by a V-belt 71 trained around a drive pulley 72 (FIG. 3) rigidly secured for rotation to the drive shaft 66. In order to drive the aligning belts 22 at a slower linear speed than the speed of the belts 20, each belt 22 is connected to a V-belt 73 trained around a drive pulley 74 which is secured to the drive shaft 54. The V-belts 71 and 73 trained around drive pulleys 72 and 74, respectively, are at their opposite ends trained around idler pulleys 76 adjacent the discharge end of the aligning machine 12. The idler pulleys 76 are supported by a transversely extending angle bar support 77 secured at each end to the frame angles 24 and 26. The two pulleys 76 which are associated with a common aligning unit 18 are angled at approximately 90° to each other and 45° to the support 77 to define the aforementioned V-shaped trough.

The aligning belts 20 and 22 may be formed of plastic or fabric and the edge of each belt 20 and 22 adjacent the bottom of each trough formed by two adjacent belts is stitched to its associated V-belt 71 and 73, respectively, as illustrated at 79 in FIGURE 7. It will be seen, therefore, that rotation of the V-belt drive pulleys 72 and 74 results from movement of the conveyor 38 and that said rotation, due to the employment of two different drive ratios, will drive the aligning machine belts 20 and 22 at different speeds. As previously mentioned, substantially all the fruit advanced by the upper flights of the belts is thus caused to rotate and become aligned in single file.

The feed mechanism 10 of the present invention includes a plurality of pocketed, endless, molded rubber conveyor belts 80 (FIGS. 6 and 7), each interposed in longitudinal alignment between an aligning unit 18 and a line of cups 40 of the grading machine 14. Each belt 80 is formed of a relatively thin, flat body portion 80a, the outer surface of which is formed into a series of equally spaced V-shaped transverse walls 80b. The portion of the walls 80b most remote from the body section 80a define the outer limits of the belt 80 and each transverse wall 80b has a sloping front surface and a sloping rear surface 80f and 80r, respectively, which converge at said outer limit. Successive pairs of the wall surfaces 80f and 80r define successive pockets 81 of the belt 80. The inner periphery of the body 80a of the belt is provided with V-shaped recesses 80c, each extending into the central portion of one of the transverse walls 80b, and each recess 80c is adapted to receive a sprocket tooth of a drive member later to be mentioned. Vertically extending, longitudinal side walls 80d each include a vertical surface which defines one lateral limit of the belt 80 and an inner surface 80i which slopes toward the center of the belt. The sloping surface 80i at each side of the belt 80 define the lateral limits of the pockets 81. So that the side walls 80d will not buckle when the belt is bending around its support members, both side walls 80d are formed in segments separated by slots 80s extending transversely through each wall 80d to the outer surface of the belt body 80a. The slots 80s are positioned fore and aft of every point of the juncture of the side walls 80d with a transverse wall 80b, and intermediate of said juncture points.

The conveyor belts 80 are driven at their feed end from a drive shaft 82 which extends transversely of the feed mechanism 10 adjacent the discharge end of the aligning machine 12 and which is journalled in two bearings 84, only one being shown in FIGURE 1. Each bearing 84 is bolted to the underside of one of the frame angles 24 and 26. A drive sprocket 86, indicated in phantom lines in FIGURES 3 and 6, is secured to the drive shaft 82 at the left side of the machine and is driven by the chain 62. A series of conveyor belt drive sprockets 88 are setscrewed on the drive shaft 82 and each sprocket 88 has one of the conveyor belts 80 trained therearound in such a way that the teeth 88a of the sprockets engage the pockets 80c of the belt 80. At each side of every conveyor belt drive sprocket 88 a freely rotatable disc 89 (FIG. 5) is mounted on the shaft 82 to support the outer edges of the belt 80. The discs 89 are prevented from lateral movement away from their associated conveyor belt drive sprockets 88 by collars 87 set-screwed to the shaft 82. The opposite, or discharge end of each conveyor belt 80 is trained around a freely rotatable idler shaft 90 (FIGS. 3 and 6) which acts as an idler drum. To prevent lateral shifting of the conveyor belts 80 on the idler shaft 90, a spacing collar 91 (FIG. 2) is secured to the shaft 90 at each side of every belt 80.

The idler shaft 90 is spaced a short distance from the upper flight of the grading machine conveyor 38 and each end of the shaft 90 is journalled in a bearing block 92 (FIGS. 1 and 6), one of which depends from each frame angle 24 and 26. Movement of the conveyor 38, when the weight grading machine 14 is operating, rotates the conveyor belt drive sprockets 88 in a direction to cause the upper flight of the conveyor belts 80 to move toward the conveyor 38 in timed relation thereto. It is of particular importance to note that the linear speed of the belts 80 is slower than the average linear speed of the aligning belts 20 and 22 of the aligning machine 12, for a reason to be later explained. It is also to be noted that the speed and timing of the belts 80 relative to the conveyor 38 is such that each pocket 81 will discharge its contents into one of the cups 40.

The upper flight of each conveyor belt 80 is supported at an elevated position above the initial and terminal portions of its upper flight by a wear strip 94 (FIGS. 4 and 6) which is secured to a transversely extending angle bar support 96 positioned adjacent the drive shaft 82 and secured at each end to one of the frame angles 24 and 26. For the purpose of blocking the space between the upper and lower flights of each belt 80 and thus preventing apples from jamming the mechanism, a spacer block 98 is supported in the aperture by the wear strip 94 and the support 96. Screws 100 (FIG. 6) extend through the wear strip 94 and the support 96 into the spacer block 98.

Sloping walls are provided at each side of the initial runs of the upper flights of the conveyor belts 80 by a plurality of guide blocks 110 (FIGS. 2, 4 and 6) which are mounted upon a transversely extending angle bar support 112 disposed between the aligning machine 12 and the feed mechanism 10 of the present invention. The blocks 110 provide substantially coplanar fixed wall extensions of the aligning unit belts 20 and 22. At each end, the support angle 112 is secured to one of the frame angles 24 and 26 and the blocks 110 are retained in position thereon by a thin metal saw-tooth strap 114 which is spot welded to the upper surface of the angle 112 between adjacent blocks 110, as at 116 (FIG. 4). The strap 114 also provides a bridge surface upon which the apples are supported during movement from each aligning unit 18 to its associated conveyor belt 80. A resilient pad 117 is cemented to the strap 114 at each bridge-forming portion thereof to furnish a protective surface which will not bruise the fruit. A screw 118 secures the downstream end of each block 110 to the angle bar 96 and that particular end of each block 110 slopes upwardly toward the aligning units 18 and is disposed between adjacent ones of the belts 80.

For the purpose of receiving any fruit which may be rejected by the feed mechanism 10, a collecting tray 119 (FIGS. 1 and 3) is disposed beneath the conveyor belts 80 and extends from side to side of the machine. The tray 119 is supported and guided by two transversely extending angle bars 120 which are fixed at each end to one of two angle bar supports 122. The bars 122 are welded to associated ones of the vertical bars 46 and to vertical angle bars 124 depending from the frame angles 24 and 26. The tray 119 may thus be slid out from either side of the machine. A guide angle 126 is bolted to the angles 124 and extends over one edge of the tray 119 to keep the tray level and clear of the conveyor belts 80 when the tray is partially withdrawn. Fruit which is discharged by the aligning machine 12 and which is not properly seated in a pocket 81 of one of the belts 80 is guided into the tray 119 by a sloping guide panel 128 which extends across the machine under the conveyor belts 80 and is secured to the underside of the bearing blocks 92. The bearing blocks 92 thus support the panel 128 and also provide end walls for the guide panel.

The upstream ends of the dividing walls 41 (FIG. 2) which separate the lines of cups 40 of the weight grading machine 14 are positioned between adjacent conveyor belts 80 of the feed mechanism 10 adjacent the discharge end of belts 80. A rubber fender strip 134 (FIGS. 2, 3 and 6) is secured to the upstream end of each wall 41 for cushioning the edges of the walls 41 and for extending down to contact the upper surface of the guide panel 128 so as to prevent apples which are rejected by the feed mechanism 10 from falling over the upper end of the panel 128 through the opening between adjacent belts 80. One fender strip 134 is also affixed to the upstream end of each of the side walls 45.

In order to assure that the fruit conveyed by the belts 80 will be gently lowered into the cups 40 of the weight grading machine 14, a rubber transition flap 136 (FIG. 6) is positioned between the discharge end of each belt 80 and its associated line of cups 40. Each flap 136 is cemented to a support tube 138 and, as may best be seen in FIGURE 2, each flap is divided into two portions extending longitudinally of the conveyor 38 which allow the weight of the fruit conveyed by the flap to depress it into the form of a trough. The support tubes 138 are pivotally mounted upon a transverse rod 140 (FIG. 6) which is secured to the lower corner of the upstream end of each of the walls 41 and 45 by clips 142.

To initiate operation of the feed mechanism 10 of the present invention, the motor (not shown) of the weight grading machine 14 is energized, thus providing a continuous drive for the conveyor 38. Movement of the conveyor 38 rotates its associated shaft 44 at the feed end of the grading machine, which in turn continuously drives the belts 20 and 22 of the aligning units 18 and the conveyor belts 80 of the feed mechanism 10 by means of the chains 62 and 50 (FIG. 2). A bulk lot of apples is deposited at the feed end 15 of the aligning machine 12 and the apples roll down the inclined plate 16 onto the aligning belts 20 and 22 of the aligning units 18. As the apples are advanced by the belts toward the feed mechanism 10, they are arranged into a single file in each of the aligning units 18. When the foremost apple in an aligning unit 18 arrives at the ends of the aligning belts 20 and 22, the apple is pushed over the pad 117 at the bridge-forming portion of the strap 114 by the apples behind it. This foremost apple drops from the pad 117 into one of the pockets 81 of the associated moving conveyor belt 80 and is carried to the discharge end of the belt. The discharge end of the upper flight of each belt 80 is downwardly inclined from its substantially horizontal central portion so as to position the fruit conveyed by the belt 80 close to the flap 136 (FIG. 6) before it is allowed to drop thereon by gravity. The individual pockets 81 of the conveyor belt 80 are so timed in relation to the cups 40 of the conveyor 38, that apples conveyed in successive pockets 81 of the belt will roll down the flap 136 into successive cups 40 of the weight grading machine 14.

Particular reference should now be made to FIGURE 7 for an understanding of the manner in which the feed mechanism 10 of the present invention will prevent two apples at a time from being carried in one of the pockets 81 of the conveyor belts 80 and will positively reject all fruit in excess of one fruit per pocket 81.

In the event that two apples, indicated in phantom lines at 143 and 144, in successive pockets 81 of one of the belts 80 should have a third apple 145 supported upon them and lying against one or the other of the adjacent walls of the guide blocks 110, the third apple will be advanced with the first two apples along the path indicated at 146. When the belt 80 has advanced the uppermost apple beyond the downstream end of the guide block 110, it is evident that it can no longer be supported by the guide block and will fall to the panel 128 and roll into the collecting tray 119.

If that third apple 145 is supported only by the two apples 143 and 144 in successive belt pockets 81, and contacts neither of the adjacent guide blocks 110, the rise of the initial run of the belt 80, indicated at 150 in FIGURE 6, will upset the precarious balance of the uppermost apple 145 and it will fall to the panel 128 and be guided into the tray 119.

In the rarely occurring event that two very small apples are deposited side by side upon the strap 114, as shown in phantom lines at 152 in FIGURE 7, the apples on the aligning belts 20 and 22 behind the two small apples push both small apples across the strap 114 and against the apple leading them. Because the speed of advance of the apples upon the aligner unit 18 is faster than the speed of advance of the apples in the pockets 81 of the belt 80, the two small apples 152 are prevented from dropping into one pocket 81 of the belt 80 because they are forced laterally out of alignment due to the fact that the forward apple in one of the pockets 81 exerts a lateral resisting force tending to separate the two small apples while the trailing apple on the aligner unit 18 contacts the pair of small apples and also exerts lateral forces on the pair of apples which tends to separate the same. It will be understood, therefore, that the two small apples 152 will be pushed aside by the above forces and therefore the small apples 152 will be unsupported after progressing beyond the blocks 110, and at least one of these apples will fall upon the panel 128 and roll into the collecting tray 119.

The apples are conveyed in the pockets 81 of the conveyer belts 80 until they descend by gravity from the pockets 81 at the discharge end of the belts. However, it is to be noted that each apple is supported by the surface 80r (FIG. 6) of the leading transverse wall 80b of its pocket 81, until the apple is disposed adjacent the transition flap 136. The transfer of the apple to the transition flap 136 is thence accomplished rapidly but in a manner gentle enough to avoid marring the surface of the apple, as the wall 80b supporting the descending apple turns down around the idler shaft 90. The apple rolls down the flap 136 into one of the moving cups 40 and is carried through the weight grading machine 14 where it is segregated from apples of a different weight range and may then be further processed or packed.

From the foregoing description it will be seen that the present invention provides a single file feed conveyor which will positively reject apples other than those presented to it in single file and which is constructed with but a minimum of simplified parts. The feed conveyor is so arranged and cooperates with an aligning machine and with a weight grading machine in such a way that it discharges only one apple at a time into a carrier cup of the grading machine.

It will be understood that the invention is not limited to the precise details of construction illustrated but that various modifications and variations may be resorted to without departing from the spirit or scope of the invention and I deem myself entitled to all such variations and modifications as come within the scope of the appended claims.

Having thus described my invention, what I claim as new and desire to protect by Letters Patent is:

1. A feed mechanism comprising a longitudinally extending belt having a plurality of article receiving pockets therein, drive means connected to said belt for advancing the pockets thereof at a predetermined speed, a pair of feed conveyors aligned with said guide means and defining a V-shaped trough, means for driving said conveyors at different speeds for aligning and directing articles into the pockets of said belt at a speed which tends to be faster than the speed at which the articles can be received one at a time by said pockets, and longitudinally extending sloping guide means aligned with said conveyors and disposed along the sides of a portion of said belt and arranged to guide an aligned article into each of said pockets and to cause articles which avoid alignment to be deflected transversely from said belt upon movement beyond said guide means.

2. A feed mechanism comprising a longitudinally extending driven belt having a forward end and a plurality of article receiving pockets therein, drive means connected to said belt for advancing the belt and pockets thereof at a predetermined speed, means for substantially aligning and directing a line of abutting articles into the pockets of said belt at a speed which tends to be faster than the speed at which the articles can be received by said pockets, and longitudinally extending guide means disposed along the sides of the forward portion of said belt and arranged to guide an aligned article into each of said pockets, said belt being arranged to carry an article in each pocket so that the so carried article in contact with a misaligned article being urged forwardly between said guide means by abutting articles on said aligning and directing means resists the movement of said misaligned article and exerts a lateral force on said misaligned article which moves the same away from said belt upon advancement past said guide means.

3. A feed mechanism comprising a longitudinally extending driven belt having a forward end and a plurality of article receiving pockets therein, drive means connected to said belt for advancing the pockets thereof at a predetermined speed, means for substantially aligning and directing a line of abutting articles into the pockets of said belt at a speed which tends to be faster than the speed at which the articles can be received by said pockets, and longitudinally extending guide means disposed along the sides of the forward portion of said belt and arranged to giude an aligned article into each of said pockets, said belt being arranged to carry an article in each pocket so that a so carried article in contact with a misaligned article resists the movement of said misaligned article and an article carried by said aligning means which contacts said misaligned article tends to advance said misaligned article whereby both said resisting and said advancing articles exert lateral forces on said misaligned article to move the same away from said belt upon advancement past said guide means.

4. A feed mechanism comprising a conveying belt having a plurality of article receiving pockets therein, guide means adjacent each side of said belt for guiding aligned articles into said pockets, a pair of feed conveyors aligned with said guide means and defining a V-shaped trough, means connected to said feed conveyors for driving said conveyors at different speeds for aligning articles and for advancing the articles between said guide means and onto said belt for reception in said pockets, and drive means connected to said belt for driving said belt at a speed slower than the speed of articles advanced thereto by said conveyors, said conveyors being adapted to urge articles advanced thereby into abutting engagement against each other and against articles previously delivered into said pockets to cause aligned articles to enter succeeding pockets and to apply a transverse force on articles which avoid alignment to displace the same transversely of said belt after advancement past said guide means.

5. A feed mechanism for discharging one of a plurality of random sized articles at a time into one of a series of cups of a continuously driven conveyor comprising a narrow conveyor belt having an inlet end and a discharge end which communicates with said conveyor, means defining a plurality of equally spaced pockets in said belt, means connected to said continuously driven conveyor for supporting and driving said conveyor belt in timed relation with and in the same direction as the continuously driven conveyor, guide means disposed forwardly of and along the sides of said conveyor adjacent the inlet end thereof and sloping toward said conveyor, article support means disposed between the forward ends of said guide means and over said inlet end of said belt, a pair of feed conveyors aligned with said guide means and defining a V-shaped trough, and means for driving said feed conveyors at different speeds for feeding and aligning articles upon said support means and between said guide means at a rate which tends to exceed the speed of articles carried in said pockets whereby an article being received in one of said pockets restrains the movement of the following article.

6. A feed mechanism for discharging one article at a time into one of a series of cups of a continuously driven conveyor comprising a narrow conveyor belt having an inlet end and a discharge end which communicates with said conveyor, means defining a plurality of equally spaced pockets in said belt, each of said pockets having an article supporting base and sides sloping outwardly from said base, means connected to said continuously driven conveyor for supporting and driving said conveyor belt in timed relation with and in the same direction as the continuously driven conveyor, guide means disposed forwardly of and along the sides of said conveyor adjacent the inlet end thereof and sloping towards said conveyor, and means for frictionally feeding articles into said guide means at a rate which tends to exceed that at which said conveyor belt can receive one article at a time in each pocket and remove the article from contact with said guide means whereby articles which avoid becoming seated in a pocket will gravitate from said conveyor.

7. A feed mechanism for discharging one of a plurality of random sized articles at a time into one of a series of cups of a continuously driven conveyor comprising a narrow conveyor belt having an inlet end and a discharge end which communicates with said conveyor, a plurality of laterally extending V-shaped walls spaced at equal intervals longitudinally of said belt, each of said walls defining a V-shaped recess opening inwardly of said belt and defining a lateral wall directed outwardly of said belt, vertically extending outwardly directed walls integral with the sides of said belt and extending longitudinally thereof, said vertically extending walls being provided with slots at equal intervals therealong, said lateral walls and said vertically extending walls together defining a plurality of article carrying pockets spaced longitudinally of said belt, and drive means connected to said continuously driven conveyor and to said belt for driving said belt in timed relation with said conveyor, said drive means including a drive sprocket having V-shaped teeth adapted to be received in said V-shaped recesses for positively engaging said belt.

References Cited in the file of this patent

UNITED STATES PATENTS

| 928,958 | Gilson | July 27, 1909 |
| 1,229,979 | Kyle | June 12, 1917 |
| 2,558,205 | Ashlock | June 26, 1951 |